(12) United States Patent
Kumagai et al.

(10) Patent No.: US 9,159,007 B2
(45) Date of Patent: **\*Oct. 13, 2015**

(54) NETWORK SYSTEM, NETWORK APPARATUS AND START INDICATING APPARATUS

(71) Applicant: Seiko Epson Corporation, Tokyo (JP)

(72) Inventors: Hikaru Kumagai, Nagano-ken (JP); Yuji Mukai, Nagano-ken (JP); Kyoichi Kamijima, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/777,624

(22) Filed: Feb. 26, 2013

(65) Prior Publication Data

US 2013/0229688 A1 Sep. 5, 2013

(30) Foreign Application Priority Data

Mar. 2, 2012 (JP) ................................. 2012-046263

(51) Int. Cl.
*G06F 3/12* (2006.01)
*G06K 15/00* (2006.01)
*H04L 12/12* (2006.01)

(52) U.S. Cl.
CPC .............. *G06K 15/40* (2013.01); *G06K 15/402* (2013.01); *G06K 15/406* (2013.01); *H04L 12/12* (2013.01); *Y02B 60/34* (2013.01)

(58) Field of Classification Search
None
See application file for complete search history.

(56) References Cited

U.S. PATENT DOCUMENTS

| | | | |
|---|---|---|---|
| 2004/0139385 A1 | 7/2004 | Sakaue | |
| 2005/0163514 A1* | 7/2005 | Hwang | 399/8 |
| 2006/0182128 A1* | 8/2006 | Nakata et al. | 370/401 |
| 2006/0200704 A1 | 9/2006 | Takahashi et al. | |
| 2007/0189258 A1* | 8/2007 | Kikuchi et al. | 370/338 |
| 2008/0080500 A1* | 4/2008 | Shimura et al. | 370/389 |
| 2009/0201547 A1* | 8/2009 | Noguchi et al. | 358/1.15 |
| 2010/0188698 A1* | 7/2010 | Koizumi | 358/1.15 |
| 2010/0210240 A1* | 8/2010 | Mahaffey et al. | 455/411 |
| 2010/0328707 A1* | 12/2010 | Miyake | 358/1.15 |
| 2011/0162048 A1* | 6/2011 | Bilbrey et al. | 726/4 |

FOREIGN PATENT DOCUMENTS

| | | | |
|---|---|---|---|
| JP | 2003-319083 A | 11/2003 | |
| JP | 2004-166257 A | 6/2004 | |
| JP | 2005-051473 A | 2/2005 | |
| JP | 2005-333229 A | 12/2005 | |
| JP | 2006-172186 A | 6/2006 | |
| JP | 2007-149106 A | 6/2007 | |
| JP | 2008-155375 A | 7/2008 | |
| JP | 2008-250544 A | 10/2008 | |
| JP | 2010-278778 A | 12/2010 | |
| JP | 2012-006389 A | 1/2012 | |

\* cited by examiner

*Primary Examiner* — Vincent Rudolph
*Assistant Examiner* — Richa Mishra

(57) ABSTRACT

A network apparatus transmits the completion notice of the start to a start indicating apparatus in a case of completing a start processing to be executed according to a start indication. In a case of monitoring and receiving the receipt of the completion notice of the start transmitted from the network apparatus, the start indicating apparatus transmits the completion notice of the start with respect to a terminal apparatus through a repeating apparatus.

18 Claims, 9 Drawing Sheets

NETWORK SYSTEM, NETWORK APPARATUS AND START INDICATING APPARATUS

CROSS REFERENCE TO RELATED APPLICATIONS

This application claims priority to Japanese Application No. 2012-046263, filed Mar. 2, 2012, the entirety of which is incorporated by reference herein.

BACKGROUND

1. Technical Field

The present invention relates to a network system, a network apparatus and a start indicating apparatus.

2. Related Art

There is known a technology which starts a network apparatus, for example, WOL (Wake on LAN), by a remote control through a network. The network apparatus corresponding to WOL, for example, mounts a network adapter which is able to interpret a predetermined packet, called a Magic Packet, that indicates a start. Then, the network apparatus starts in a case where the network adaptor detects that the predetermined packet is received.

According to this, for example, JP-A-2005-333229 discloses a system in which a terminal starting apparatus and a terminal apparatus are connected with a start requesting terminal through a router apparatus. In this system, the start requesting terminal transmits start requesting information to the terminal starting apparatus through a router apparatus, the terminal starting apparatus receives the start requesting information through the router apparatus and transmits a packet including a start requesting sequence to the terminal apparatus.

However, in JP-A-2005-333229 described above, even though the start of the terminal apparatus has completed, the information which indicates that the start of the terminal apparatus has completed is not notified with respect to the terminal starting apparatus as well as the start requesting terminal. Furthermore, the information which indicates the status of a start processing at the terminal is not notified with respect to the terminal starting apparatus as well as the start requesting terminal. Therefore, the following problems occur in which anxiety is experienced by a user.

For example, for some reasons, in a case where the terminal apparatus is unable to complete the start processing, it is difficult for the start requesting terminal to determine whether the start processing is completed or not. Furthermore, for example, for some reasons, in a case where the start processing time until the terminal apparatus completes the start processing, takes longer, it is difficult for the start requesting terminal to determine whether the start processing is executed or not.

In addition, in JP-A-2005-333229 described above, there is a need to be provided one terminal starting apparatus. However, for example, in a case where the electric power consumption of the terminal starting apparatus is high, or the like, it is difficult to easily meet users' needs in which the electric power consumption in the system is reduced as much as possible.

SUMMARY

Aspects of the invention include some advantages of overcoming at least partially the above disadvantages. The examples are described below.

An advantage of some aspects of the invention is to make it possible to determine the status of the start processing on a network apparatus which is connected through a repeating apparatus such as a router on the terminal apparatus which performs the start request, to reduce electric power consumption in the system, including the start indicating apparatus which performs the start indication on the network apparatus, according to the start request from the terminal apparatus, and to enhance convenience of a remote start on the network apparatus.

According to a first aspect of the invention, there is provided a network system including a start indicating apparatus which transmits a start indication in relation to a network apparatus targeted for the start specified by a start request from a terminal apparatus and a network apparatus having the functions of receiving and starting the start indication, wherein the start indicating apparatus and the network apparatus are connected with the terminal apparatus through a repeating apparatus, wherein in a case of completing a start processing to be executed according to the start indication, the network apparatus includes a status transmitting section that transmits the completion notice of the start to the start indicating apparatus, wherein the start indicating apparatus includes a status monitoring section that transmits the completion notice of the start with respect to the terminal apparatus through the router in a case of monitoring and receiving the receipt of the completion notice of the start, and wherein the terminal apparatus includes s status receiving section that receives the completion notice of the start from the start indicating apparatus.

In such a configuration, it is possible to determine the status of the start processing (the completion of the start processing) on the network apparatus, which is connected through the repeating apparatus, on the terminal apparatus.

Here, the status transmitting section may transmit the status notice of the start processing to the start indicating apparatus before completing the start processing, the status monitoring section may transmit the status notice of the start processing to the terminal apparatus in a case of monitoring and receiving the receipt of the status notice of the start processing, the status receiving section may receive status notice of the start processing from the start indicating apparatus and the terminal apparatus may include a status displaying section for displaying the status of the start processing in a case of receiving the status notice of the start processing until after receiving the completion notice of the start.

In such a configuration, it is possible to determine the status of the start processing on the network apparatus, which is connected through the repeating apparatus, on the terminal apparatus even before completing the start on the network apparatus.

Further, the status notice of the start processing may include information which indicates the initiation of the start processing, and the status displaying section displays information which indicates that the start processing has been initiated.

In such a configuration, it is possible for the terminal apparatus to determine that the start processing has been initiated as well as to notify a user of that fact.

Further, the status notice of the start processing may include an estimated time required of the start processing and the status displaying section may display the state of progress of the start processing based on the estimated time required.

In such a configuration, it is possible for the terminal apparatus to determine the state of progress of the start processing as well as to notify a user of the state of progress of the start processing.

Further, the network system described above may be provided with two or more of the network apparatus and any one of the plurality of the network apparatus may function as the start indicating apparatus.

In such a configuration, there is no need to be provided with the dedicated start indicating apparatus separately and it is possible to reduce electric power consumption, cost, and the like in the entire system.

Furthermore, the start indicating apparatus may include a apparatus information collecting section that collects the apparatus information on each of the network apparatuses, a switching section that selects the network apparatus satisfying a predetermined condition based on the collected apparatus information and switches the selected network apparatus so as to function as the start indicating apparatus, wherein the network apparatus may include an apparatus information transmitting section that transmits the apparatus information to the start indicating apparatus.

In such a configuration, it is possible to dynamically switch the start indicating apparatus and operate the network apparatus, which satisfies users' desired conditions, as the start indicating apparatus.

Furthermore, the apparatus information may include electric power consumption information in the apparatus, performance information in the apparatus or usage history information in the apparatus, and the switching section may select the network apparatus which has the minimum electric power consumption, the highest performance, or the highest frequency of use based on the apparatus information.

It is possible to reduce electric power consumption as much as possible in the system by the start indicating apparatus being selected according to such various types of predetermined conditions.

According to a second aspect of the invention, there is provided a start control method of a network system including a terminal apparatus, a start indicating apparatus which transmits a start indication in relation to a network apparatus targeted for the start specified by the start request from the terminal apparatus and a network apparatus having the functions of receiving and starting the start indication, wherein the start indicating apparatus and the network apparatus are connected with the terminal apparatus through a router, and the method includes causing the network apparatus to transmit the completion notice of the start to the start indicating apparatus in a case of completing a start processing to be executed according to the start indication, causing the start indicating apparatus to transmit the completion notice of the start with respect to the terminal apparatus through the router in a case of monitoring and receiving the receipt of the completion notice of the start, and causing the terminal apparatus to receive the completion notice of the start from the start indicating apparatus.

According to a third aspect of the invention, there is provided a network apparatus including the functions of receiving and starting a start indication from a start indicating apparatus which transmits the start indication in relation to a network apparatus targeted for the start specified by the start request from a terminal apparatus, wherein the network apparatus includes a status transmitting section that transmits the completion notice of the start to the start indicating apparatus in a case of completing a start processing to be executed according to the start indication.

According to a fourth aspect of the invention, there is provided a start indicating apparatus which transmits a start indication in relation to a network apparatus targeted for the start specified by the start request from a terminal apparatus, wherein the start indicating apparatus and the network apparatus are connected with the terminal apparatus through a router, and the start indicating apparatus includes a status monitoring section that transmits the completion notice of the start with respect to the terminal apparatus through the router in a case of monitoring and receiving the receipt of the completion notice of the start which is transmitted from the network apparatus and indicates the completion of a start processing to be executed according to the start indication.

According to a fifth aspect of the invention, there is provided a program which makes a computer function by a start indicating apparatus which transmits a start indication in relation to a network apparatus targeted for the start specified by a start request as a terminal apparatus which transmits the start request, wherein the start indicating apparatus and the network apparatus are connected with the terminal apparatus through a router, and the program makes the computer function as a status receiving section that receives the completion notice of the start which indicates the completion of a start processing to be executed according to the start indication from the start indicating apparatus on the network apparatus.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

Below, an example of a first embodiment of the present invention will be described with reference to the drawings.

In the embodiment, description will be given taking a printing apparatus such as a printer or a multifunction printer as an example of a network apparatus having the function of a remote start. Further, description will be given taking a printing apparatus as an example of a start indicating apparatus giving a start indication to the network apparatus. Further, description will be given taking an information processing apparatus such as a PC as an example of a terminal apparatus transmitting a start request on the network apparatus with respect to the start indicating apparatus.

Here, as a method of starting the network apparatus remotely from the start indicating apparatus, for example, WOL may be used, however, there is no limitation thereto.

Figure 1:
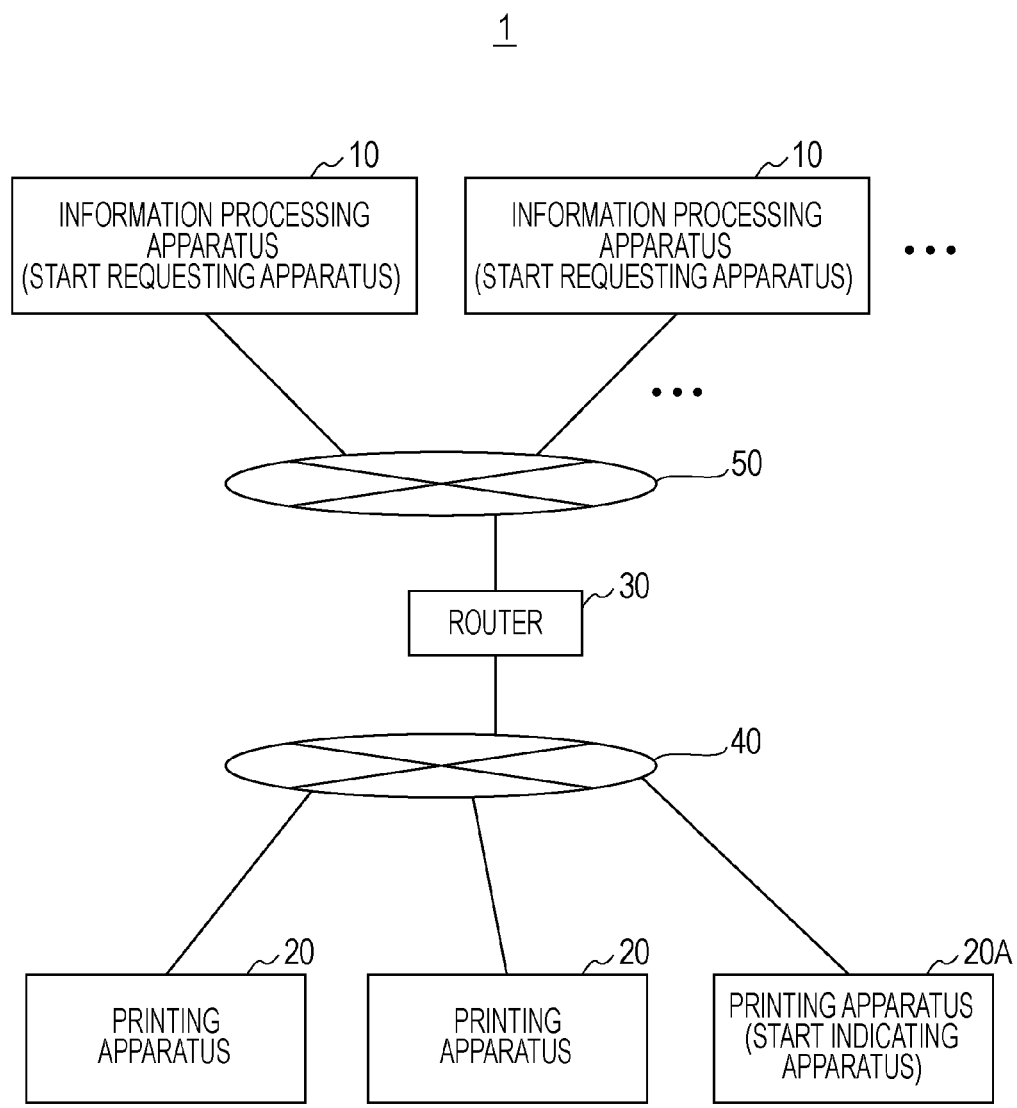
FIG. 1 is a view showing an example of a schematic configuration of a printing system according to a first embodiment of the invention.

FIG. 1 is a view showing an example of a schematic configuration of a printing system according to a first embodiment of the invention.

A printing system 1 includes an information processing apparatus (start requesting apparatus) 10, a printing apparatus 20 and a printing apparatus (start indicating apparatus) 20A. It is possible for any of the printing apparatuses to function as a printing apparatus as well as to function as a start indicating apparatus. In the embodiment, any one of the printing apparatuses operates as the start indicating apparatus. Here, in a case where none of the printing apparatuses are set to operate as the start indicating apparatus, for example, as an initial setting, any one of the printing apparatuses is set by a user to operate as the start indicating apparatus.

The printing apparatus 20 and the printing apparatus 20A are connected to a LAN (Local Area Network) 40. Further, the LAN 40 is connected to an outside network 50 through a router 30 that is one example of a repeating apparatus. The information processing apparatus 10 is connected to the outside network 50.

It is possible for the information processing apparatus 10 to transmit a printing indication with respect to the printing apparatus 20 and the printing apparatus 20A during operation through the router 30.

Here, a broadcast packet used for the start indication in the network apparatus is generally unable to be transmitted to another network beyond the router due to restrictions such as the security in WOL or the like.

Therefore, the information processing apparatus 10 transmits the start request, which specifies identification information (for example, MAC address and IP address) in the printing apparatus 20 targeted for the start, with respect to the printing apparatus (start indicating apparatus) 20A using a unicast. Then, the printing apparatus 20A transmits a start indication including the identification information specified by the start request in the printing apparatus 20 to LAN 40 using a broadcast. Here, it is possible for the information processing apparatus 10 to transmit a printing indication to the printing apparatus 20 using a unicast after the printing apparatus 20 starts.

The information processing apparatus 10 functions as a host computer for the printing apparatus 20 and the printing apparatus 20A. The information processing apparatus 10, is a computer including, for example, an input apparatus such as a CPU, a RAM, a ROM, an auxiliary storage apparatus, a network I/F, a display, a mouse and a keyboard.

For example, OS (Operating System), an application program, a printer driver program, or the like is installed in the information processing apparatus 10. The printer driver, for example, generates the print data based on data targeted for the printing that has been generated in the application and print settings that have been specified, and transmits the print data to the printing apparatus 20 and the printing apparatus 20A.

The printing apparatus 20 and the printing apparatus 20A, for example, are printers such as an ink jet printing method or an electrophotographic method.

The printing apparatus 20 includes a normal mode and a power saving mode, and performs a migration and a return between those operation modes. In the embodiment, the power saving mode means, for example, a mode which turns off the power other than the device or a part of the device that is required for monitoring a predetermined packet indicating the start. Naturally, the printing apparatus 20 may include one or more other modes (for example, a power saving mode in which the electric power consumption is lower than that of a normal mode and the electric power consumption is higher than that of a power saving mode).

On the other hand, the printing apparatus 20A does not migrate to a power saving mode which requires the start by the start indication while being the start indicating apparatus. This is because there is a need to accept the start request of the printing apparatus 20 from the information processing apparatus 10.

Figure 2:
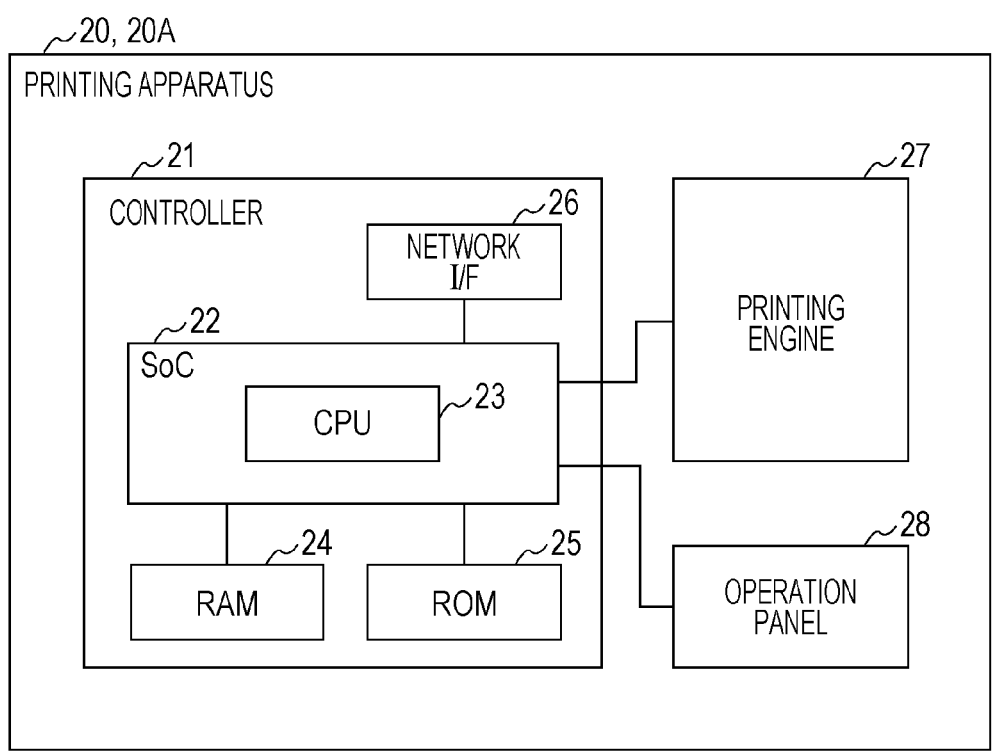
FIG. 2 is a view showing an example of a schematic configuration of hardware in a printing apparatus.

The printing apparatus 20 and the printing apparatus 20A, for example, as shown in FIG. 2, include a controller 21, a printing engine 27 and an operation panel 28. The controller 21 includes a SoC (System on Chip) 22, a RAM 24, a ROM 25 and a network interface (I/F) 26.

The SoC 22 is a main control unit for processing to control the entire printing apparatus and includes a CPU 23, various types of interface control circuits or the like.

The RAM 24 is a volatile storage apparatus which stores data, or the like used for various types of programs and various types of processes. The ROM 25 is a non-volatile storage apparatus which stores data, or the like used for various types of programs and various types of processes.

The network I/F 26 is a network adaptor corresponding to the remote start (for example, WOL) and controls network communications. The network I/F 26 monitors the receipt of a predetermined packet that indicates the start, and generates interrupt signals and outputs them to the SoC 22 in a case where the receipt of the packet is detected. The interrupt signals are set as triggers and the SoC 22 makes the printing apparatus 20 return to a normal mode from a power saving mode.

The printing engine 27 prints print data, which is output from the controller 21 based on the indication from the controller 21, onto the printing medium. As a printing method for the printing engine 27, for example, an ink jet printing method, an electrophotographic method, or the like can be adopted.

The operation panel 28 functions as an interface between a user and a printing apparatus. The operation panel 28, for example, includes a display for displaying an image or the like, and an input apparatus such as a touch panel and a button for accepting user's operations.

The above is one example of a schematic configuration of a printing system 1. However, these configurations describe the main configurations in order to describe the characteristics of the invention, the invention is not limited to the configurations described above. Further, this does not preclude these configurations in which a general printing system, an information processing apparatus, a printing apparatus and a start indicating apparatus include. For example, the number of the information processing apparatus or the printing apparatus is not limited to the description above.

Next, a concept of processing that can be realized in the above printing system 1 will be described.

Figure 3:
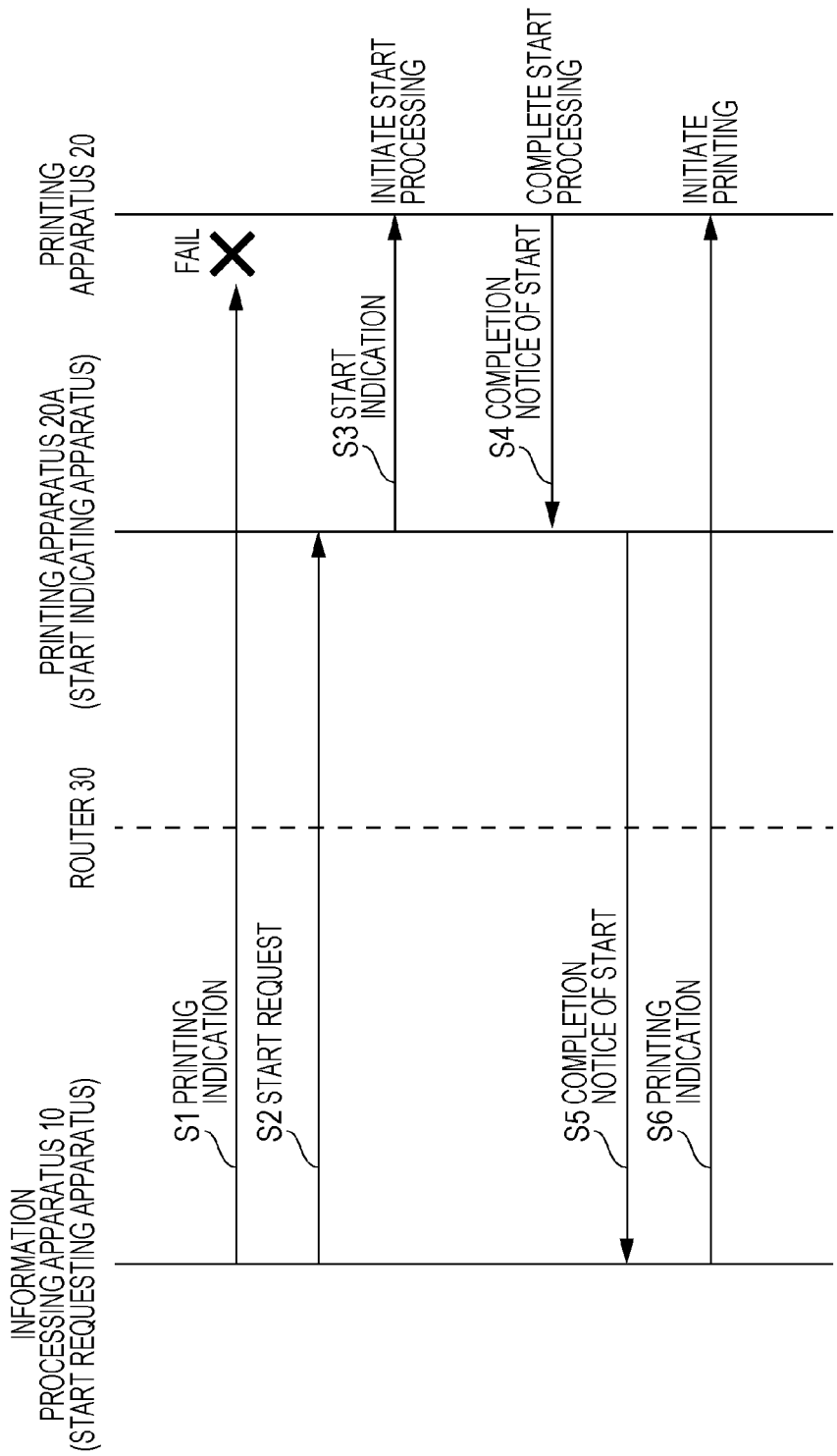
FIG. 3 is a view showing an example of a concept of a start sequence of a printing apparatus in a printing system.

FIG. 3 is a view showing an example of a concept of a start sequence of a printing apparatus in a printing system. Here, when the sequence is initiated, the printing apparatus 20A is in a normal mode and the printing apparatus 20 is in a power saving mode.

When the information processing apparatus 10 transmits the printing indication to the printing apparatus 20 and fails to execute any printing (S1), the start request including identification information (for example, MAC address or IP address) of the printing apparatus 20 is transmitted to the printing apparatus (start indicating apparatus) 20A (S2).

When the printing apparatus 20A receives the start request, the start indication including identification information of the printing apparatus 20, specified by the start request, is transmitted to the printing apparatus 20 by transmitting to LAN 40 using a broadcast or the like (S3). For example, this start indication is performed by broadcasting a Magic Packet. When the printing apparatus 20 receives the start indication, the migration from the power saving mode to the normal mode, in other words, a start processing is initiated.

When the start processing is completed, the printing apparatus 20 transmits the completion notice of the start which indicates that the start processing has been completed to the printing apparatus 20A (S4). The completion notice of the start may be transmitted using a unicast or may be transmitted using a broadcast.

When the completion notice of the start is received, the printing apparatus 20A transmits the completion notice of the start which indicates that the start of the printing apparatus 20 has been completed with respect to the information processing apparatus 10 of the transmission source for the start request (S2) using a unicast (S5).

When the completion notice of the start is received, the information processing apparatus 10 re-transmits the printing indication which has been failed in S1 to the printing apparatus 20 (S6).

Here, in a case of initiating or having initiated the start processing, the printing apparatus 20 may transmit the status notice of the start including information which indicates that the start processing has initiated or the estimated starting time for the start processing to the printing apparatus 20A. In this case, the printing apparatus 20A receives the status notice of the start and transmits the status notice of the start to the information processing apparatus 10. When the information processing apparatus 10 receives the status notice of the start, the display for the status of the start is initiated.

Figure 4:
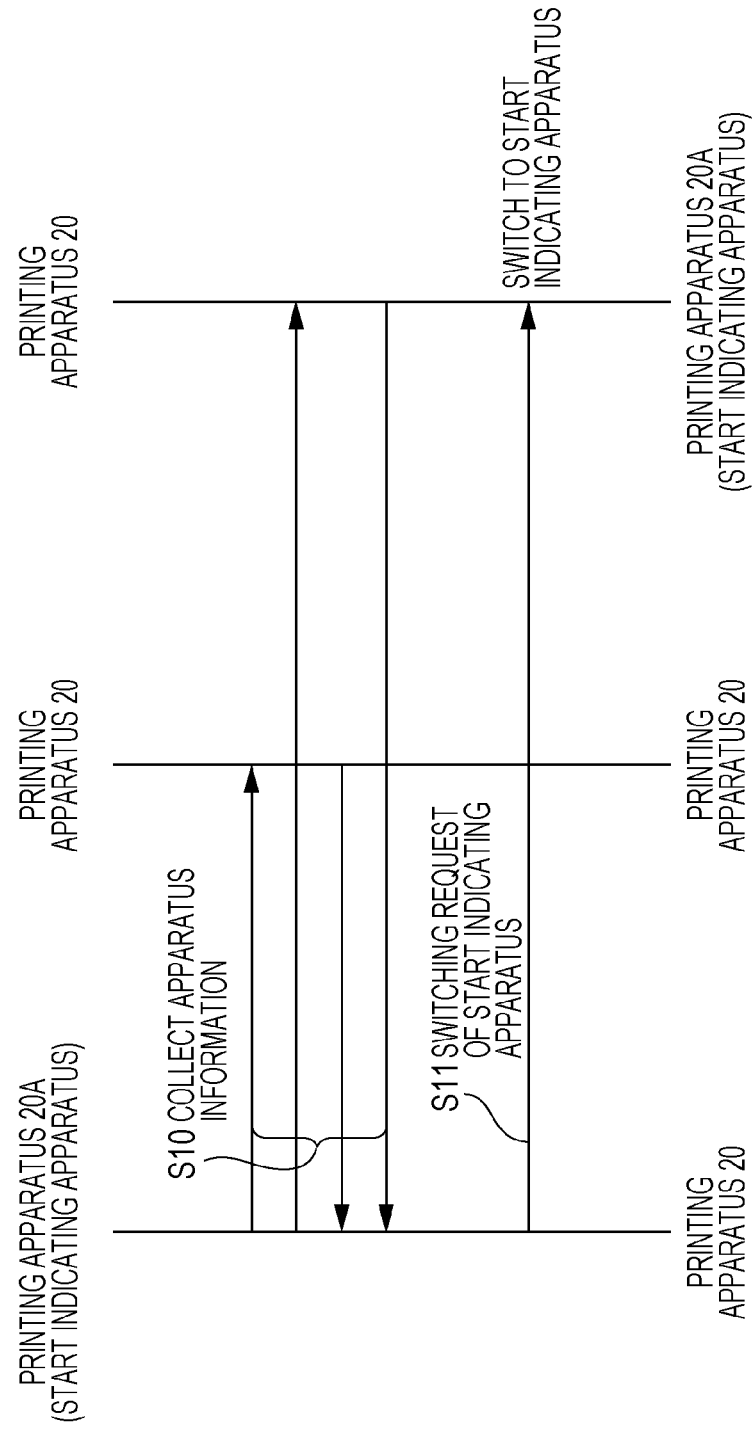
FIG. 4 is a view showing an example of a concept of a switching sequence of a start indicating apparatus in a printing system.

FIG. 4 is a view showing an example of a concept of a switching sequence of a start indicating apparatus in a printing system. Here, when this sequence is initiated, the printing apparatus 20A and the printing apparatus 20 are in a normal mode.

The printing apparatus 20A collects apparatus information of other printing apparatus 20 (S10). For example, the printing apparatus 20A requests apparatus information to the other printing apparatus 20 periodically or at the predetermined timing. The request for apparatus information may be transmitted using a unicast or may be transmitted using a broadcast. When the request for apparatus information is received, the printing apparatus 20 transmits the apparatus information of its own apparatus to the printing apparatus 20A using a unicast.

When the apparatus information of each printing apparatus 20 is received, the printing apparatus 20A selects the printing apparatus 20 satisfying the predetermined conditions based on apparatus information and transmits a switching request for the start indicating apparatus with respect to the selected printing apparatus 20 (S11). With the switching request as a turning point, the printing apparatus 20A is switched to the normal printing apparatus by stopping the functions of the start indicating apparatus, and the printing apparatus 20 which has received the switching request is switched to the printing apparatus 20A by initiating the functions as the start indicating apparatus.

Next, Details of configurations that may realize processing in the printing system 1 described above will be described.

Figure 5:
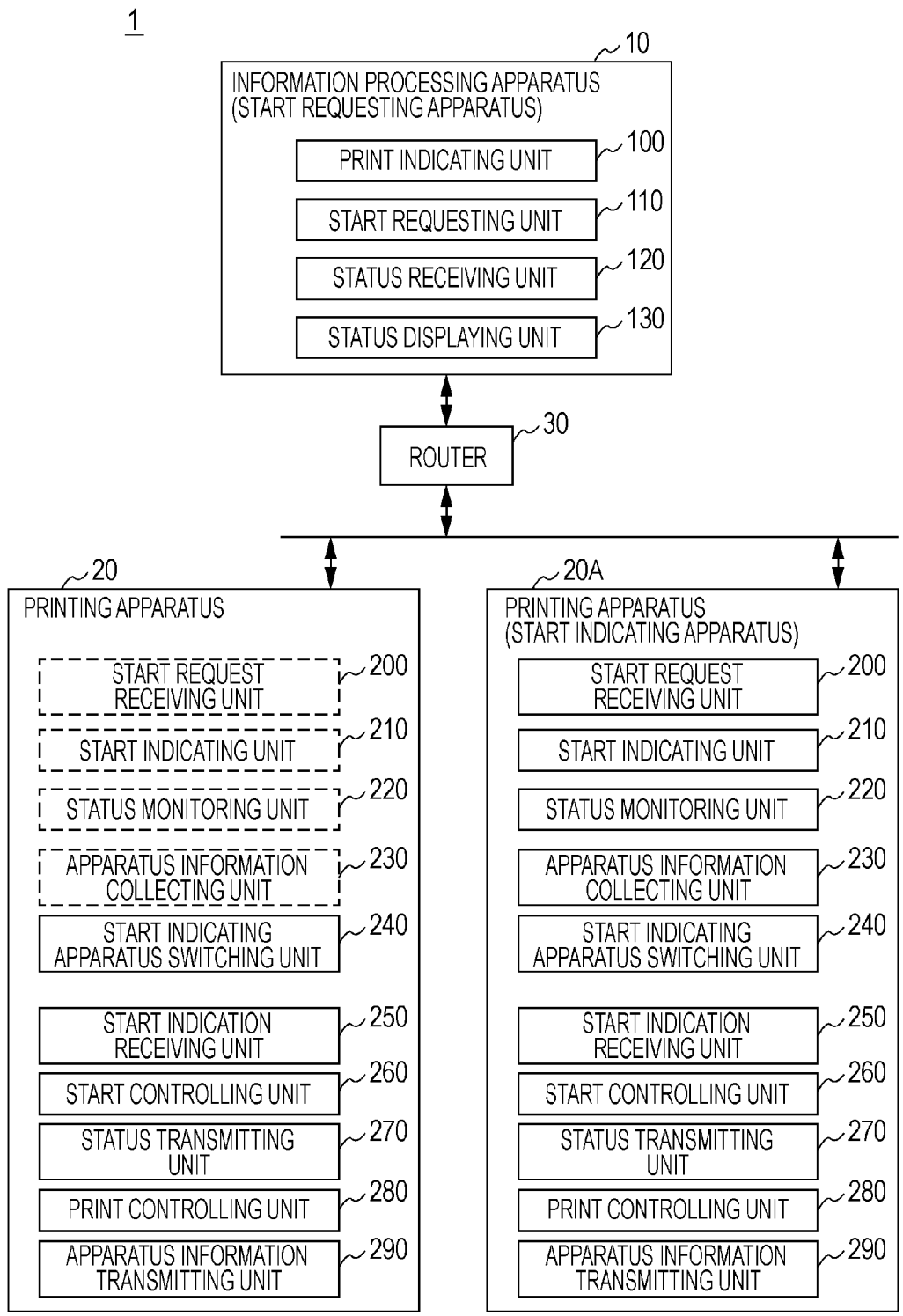
FIG. 5 is a view showing an example of a functional configuration of a printing system.

FIG. 5 is a view showing an example of a functional configuration of a printing system.

The information processing apparatus 10 includes a print indicating unit 100, a start requesting unit 110, a status receiving unit 120 and a status displaying unit 130.

These functional units are realized, for example, by executing a predetermined program which a CPU has loaded into a RAM from an auxiliary storage apparatus. The predetermined program, for example, is stored in the auxiliary storage apparatus in advance. Naturally, the predetermined program may be installed or updated by being downloaded from a network through the network I/F. Furthermore, in a case where the information processing apparatus includes an apparatus that reads a portable storage medium, the predetermined program may be installed or updated by being read from the storage medium.

Here, the predetermined program described above, for example, is realized with a printer driver program. Naturally, all or part of the functions may be realized with an OS program or an application program other than the printer driver program.

A print indicating unit 100 transmits the printing indication to the printing apparatus 20 or the printing apparatus 20A. For example, when the print indicating unit 100 accepts the operation of a printing initiation from a user through an input apparatus, data targeted for the printing and print settings are obtained and print data (print job) is generated based on those. Further, the printing indication along with the print data is transmitted to the printing apparatus selected by a user.

Further, for example, the print indicating unit 100 monitors a response from the printing apparatus with respect to the printing indication and determines whether the initiation of the printing is successful or not. Further, in a case where the completion notice of the start of the printing apparatus 20 from the printing apparatus 20A is received, if there is a printing indication which fails to initiate the printing, the print indicating unit 100 re-transmits the printing indication.

The start requesting unit 110 transmits the start request of the printing apparatus 20 to the printing apparatus 20A. For example, in a case of failure to initiate the printing, the start requesting unit 110 transmits the start request including identification information of the printing apparatus 20 targeted for the printing indication to the printing apparatus 20A using a unicast. Further, the start requesting unit 110 monitors a response from the printing apparatus 20A with respect to the start request and determines whether the start is completed or not.

Here, identification information (for example, IP address) of the printing apparatus 20A which is the destination for the start request is, for example, capable of being input (settings) with respect to the information processing apparatus 10 by users' operations in advance. Further, for example, the start requesting unit 110 may transmit a query request as to whether or not it is a start indicating apparatus using a broadcast or a multicast with respect to the printing apparatus on a LAN 40. The printing apparatus which is the start indicating apparatus may respond to the information processing apparatus 10 that is the transmission source for the query request. In this case, the router 30 may be set to permit the transmission using a broadcast or a multicast for the query request.

A status receiving unit 120 receives the status information, which is sent from the printing apparatus 20A, that indicates the status of the printing apparatus 20 targeted for the start indication. For example, the status receiving unit 120 receives information that indicates the completion of the start processing of the printing apparatus 20. Further, for example, the status receiving unit 120 receives information that indicates that the start of the printing apparatus 20 is not able to be executed.

Here, the status receiving unit 120 may receive information that indicates the initiation of the start processing of the printing apparatus 20 or the estimated starting time which is required for the start processing.

A status displaying unit 130 displays the status of the printing apparatus 20 on a display based on the status information, sent from the printing apparatus 20A, of the printing apparatus 20 targeted for the start indication. For example, in a case where the status receiving unit 120 receives information that indicates that the printing apparatus 20 is not able to start, the status displaying unit 130 displays information that indicates the inability to start using a dialog box.

Here, in a case where the status receiving unit 120 receives information that indicates the initiation of the start processing, the status displaying unit 130 may display that fact using a dialog box. Further, in a case of receiving an estimated starting time, the estimated starting time (for example, x sec) may be displayed using a dialog box. Further, for example, the estimated starting time may be displayed with a countdown process (for example, every second) as time goes on. The rate of elapsed time with respect to the estimated starting time may be displayed as a progress level using a bar form.

The printing apparatus 20 and the printing apparatus 20A include a start request receiving unit 200, a start indicating unit 210, a status monitoring unit 220, an apparatus information collecting unit 230, a start indicating apparatus switching unit 240, a start indication receiving unit 250, a start controlling unit 260, a status transmitting unit 270, a print controlling unit 280 and a apparatus information transmitting unit 290.

However, the operations of the start request receiving unit 200, the start indicating unit 210, the status monitoring unit 220 and the apparatus information collecting unit 230 are stopped, in a case where the printing apparatus is not the start indicating apparatus. That is, those functional units are operated by the printing apparatus (start indicating apparatus) 20A and not operated by the printing apparatus 20.

The start indication receiving unit 250 is realized, for example, by a network I/F 26. Other functional units are realized, for example, by executing a predetermined program which a CPC 23 has loaded into a RAM 24 from a ROM 25. The predetermined program is stored in the ROM 25 in advance. Naturally, the predetermined program may be installed and/or updated by being downloaded from on a network through the network I/F 26. Furthermore, in a case where the printing apparatus includes an apparatus that reads a portable storage medium, the predetermined program may be installed and/or updated by being read from the storage medium.

The start request receiving unit 200 receives the start request from the information processing apparatus 10. For example, the start request receiving unit 200 receives the start request including identification information (for example, MAC address and IP address) of the printing apparatus 20 targeted for the start indication from the information processing apparatus 10.

Here, in a case of receiving a query request as to whether or not it is a start indicating apparatus from the information processing apparatus 10, the start request receiving 200 may respond to the query request.

The start indicating unit 210 transmits the start indication to the printing apparatus 20 targeted for the start. For example, in a case of receiving the start request, the start indicating unit 210 determines whether or not identification information, included in the start request, of the printing apparatus 20 is included in the list of identification information (hereinafter also referred to as "the printing apparatus list"), that is collected by the apparatus information collecting unit 230, of the printing device 20.

In a case where identification information of the printing apparatus 20 targeted for the start is included in the printing apparatus list, the start indicating unit 210 transmits the start indication including the identification information to LAN 40 using a packet such as a broadband. On the other hand, in a case where the identification information is not included in the printing apparatus list, the start indicating unit 210 responds by sending information that indicates that it is difficult to start the printing apparatus 20 specified by the start request to the information processing apparatus 10, which is the transmission source for the start request, by the status monitoring unit 220.

The status monitoring unit 220 monitors the status of the start processing of the printing apparatus 20 and, along with this, notifies the status information indicating the status of the information processing apparatus 10. For example, the status monitoring unit 220 monitors whether the completion notice of the start from the printing apparatus 20 targeted for the start indication is received or not. In the case of receiving the completion notice of the start, the status monitoring unit 220 transmits the completion notice of the start indicating that the start of the printing device 20 has completed, with respect to the information processing apparatus 10, which is the transmission source for the start request, using a unicast.

Here, in a case of receiving information that indicates the initiation of the start processing or the estimated starting time from the printing apparatus 20 targeted for the start indication, the status monitoring unit 220 may transmit information that indicates the initiation of the start processing or the estimated starting time with respect to the information processing apparatus 10 which is the transmission source for the start request.

The apparatus information collecting unit 230 collects apparatus information of its own apparatus and other printing apparatus 20. For example, the apparatus information collecting unit 230 requests apparatus information to the other printing apparatus 20 periodically or at the predetermined timing. The request for apparatus information may be transmitted using a unicast or may be transmitted using a broadcast. The apparatus information collecting unit 230 stores apparatus information of each printing device 20 received as the printing apparatus list.

Here, apparatus information includes, for example, identification information of the printing apparatus, performance information of the printing apparatus (electric power consumption per unit time, print processing speed, or the like), statistical information of the printing apparatus (usage history of printing, or the like), or the like.

The start indicating apparatus switching unit 240 controls the switching of the start indicating apparatus. The operations of the start indicating apparatus switching unit 240 are varied depending on whether or not its own apparatus is the start indicating apparatus.

For example, in a case where its own apparatus is the start indicating apparatus, the start indicating apparatus switching unit 240 determines whether other printing apparatus is present or not, periodically or at the predetermined timing. For example, a search request of the printing apparatus is transmitted using a broadcast or a multicast, and the start indicating apparatus switching unit 240 may determines whether the printing apparatus is present or not depending on the presence or absence of a response. In a case where other printing apparatus is present, the start indicating apparatus switching unit 240 makes the apparatus information collecting unit 230 collect the apparatus information.

Then, the start indicating apparatus switching unit 240 selects the printing apparatus satisfying a predetermined condition based on the apparatus information of its own apparatus and the printing apparatus 20. The predetermined condition is, for example, the printing apparatus which has the lowest electric power consumption. Naturally, the predetermined condition is not limited thereto, for example, it may also be the printing apparatus which has the fastest print speed, the printing apparatus which has the highest frequency of printing, or the like. Furthermore, in a case where there is a plurality of the predetermined conditions, for example, any one may be set by users' operations. A plurality of the predetermined conditions may also be set.

Then, the start indicating apparatus switching unit 240 transmits the switching request of the start indicating apparatus with respect to the printing apparatus 20 selected as described above. Then, the functions of its own apparatus as the start indicating apparatus (start request receiving unit 200, start indicating unit 210, status monitoring unit 220 and apparatus information collecting unit 230) are stopped.

On the other hand, in a case where its own apparatus is not the start indicating apparatus, the start indicating apparatus switching unit 240 monitors whether the switching request is received or not from the start indicating apparatus. In a case of receiving the switching request, the functions of its own apparatus as the start indicating apparatus (start request receiving unit 200, start indicating unit 210, status monitoring unit 220 and apparatus information collecting unit 230) are initiated. Furthermore, the start indicating apparatus switching unit 240 initiates processing in a case when its own apparatus described above is the start indicating apparatus.

The start indication receiving unit 250 receives the start indication transmitted from the printing apparatus 20A. For example, the start indication receiving unit 250 monitors the receipt of the start indication during a power saving mode in the printing apparatus 20. Then, in a case of receiving the start indication, the start indication receiving unit 250 determines whether or not identification information (for example, MAC address or IP address) of its own apparatus in the start indication is included. In a case where identification information of its own apparatus is included, the receipt of the start indication is notified the start controlling unit 260. This notice can be realized, for example, by interrupt signals or the like.

The start controlling unit 260 controls the start of the printing apparatus. For example, in a case of accepting the notice of the receipt of the start indication from the start indication receiving unit 250, the start controlling unit 260 initiates the start processing.

When the start processing is initiated, the start controlling unit 260 controls the start of the devices (a part of controller 21, printing engine 27, operation panel 28 or the like) that were in power off state or sleep state in the power saving mode. Then, the printing device 20 is migrated (returned) from the power saving mode to the normal mode.

The status transmitting unit 270 transmits the status information that indicates the status of the printing apparatus. For example, in a case of completing the start processing, the status transmitting unit 270 transmits information that indicates that the start processing has been completed to the printing apparatus 20A of the transmission source for the start indication.

Here, the status transmitting unit 270 may transmit information that indicates the initiation of the start processing or the estimated starting time which is required for the start processing to the printing device 20A of the transmission source for the start indication. The status transmitting unit 270 may transmit the fixed estimated starting time defined in advance or may transmit the calculated estimated starting time by the estimated starting time being calculated by a predetermined procedure. In a case of calculating the estimated starting time, the status transmitting unit 270, for example, may use a predetermined formula in which the starting time varies corresponding to the temperature by detecting the temperature of the printing engine 27. If the estimated starting time is calculated, it is possible to provide the estimated starting time with higher accuracy. On the other hand, if the fixed estimated starting time is transmitted, the estimated starting time can be provided with the faster response speed.

Here, the procedure or the method for the transmission of the status information is not particularly limited, for example, and may be by transmitting using a unicast or may be by transmitting using a broadcast with respect to the printing apparatus 20A. In a case where identification information (for example, MAC address and IP address) of the printing apparatus 20A can be obtained from the received start indication or other notice, it may be transmitted using a unicast with respect to the printing apparatus 20A.

The print controlling unit 280 controls the functions of the entire printing apparatus during a normal mode. For example, when receiving the printing indication including the print data or print settings, the print controlling unit 280 generates the printing data or the control data and makes the printing engine 27 execute the printing. Further, the print controlling unit 280 monitors the triggers (for example, user's operation and predetermined time course) in which are migrated to a power saving mode, and in a case of detecting the triggers, the migration from the normal mode to the power saving mode is controlled.

Here, the print controlling unit 280 is not be immigrated to the power saving mode in which it requires the start by the start indication in the printing apparatus 20A.

The apparatus information transmitting unit 290 transmits the apparatus information of its own apparatus. For example, in a case of receiving the request for the apparatus information from the printing apparatus 20A, the apparatus information of its own apparatus is transmitted to the printing apparatus 20A using a unicast.

The above functional configurations are classified according to the main processing details in order to facilitate understanding of the configuration of the printing system 1. The present invention is not limited by the way to classify the constituent components or their names. The functional configurations of the printing system may also be classified into even more constituent components according to the processing details. Furthermore, the functional configurations may also be classified so that one constituent component executes even more processing. Furthermore, the processing of each constituent component may be executed by one piece of hardware or may be executed by a plurality of hardware.

Figure 6:
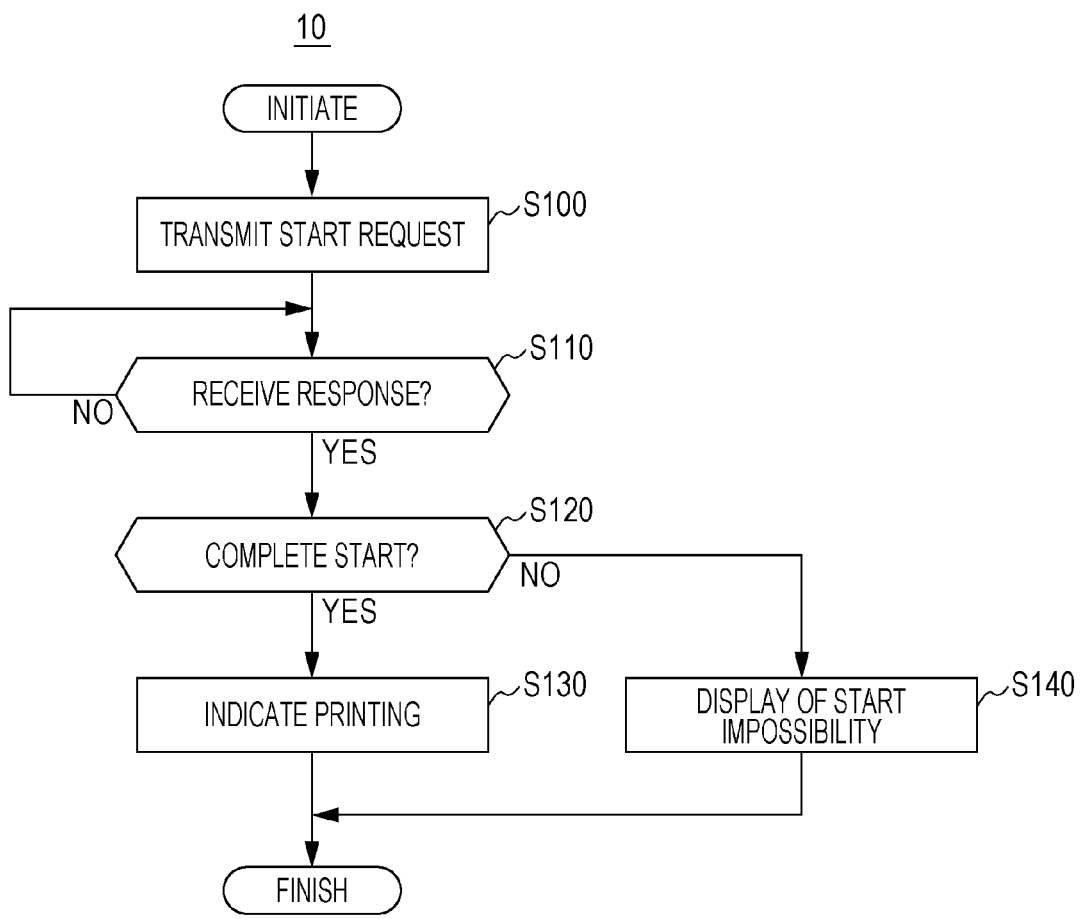
FIG. 6 is a flowchart showing an example of a start request processing in an information processing apparatus.

FIG. 6 is a flowchart showing an example of a start request processing in an information processing apparatus. The processing of this flow, for example, is initiated in a case of failing the printing indication. Naturally, the processing may be initiated at the another timing, for example, in a case where there is an operation by a user.

When the processing of this flow is initiated, the start requesting unit 110 transmits the start request to the printing apparatus 20A (S100). Then, the status receiving unit 120 monitors whether or not a response is received from the printing apparatus 20A which is the destination for the start request (S110). In a case of not receiving the response (S110: NO), monitoring is continued.

In a case of receiving the response (S110: YES), the status displaying unit 130 determines whether or not the status information indicates the completion of the start (S120).

In a case of completing the start (S120: YES), the print indicating unit 100 re-transmits the printing indication to the printing apparatus 20 (S130). On the other hand, in a case of not completing the start (S120: NO), the status displaying 130 displays information that indicates the impossibility of the start (S140). For example, the status displaying 130 displays a message to indicate the fact which it is difficult to start due to the printing apparatus 20 being turned off on a display.

After executing the processing of S130 or S140, the information processing apparatus 10 finishes the processing of this flow.

Figure 7:
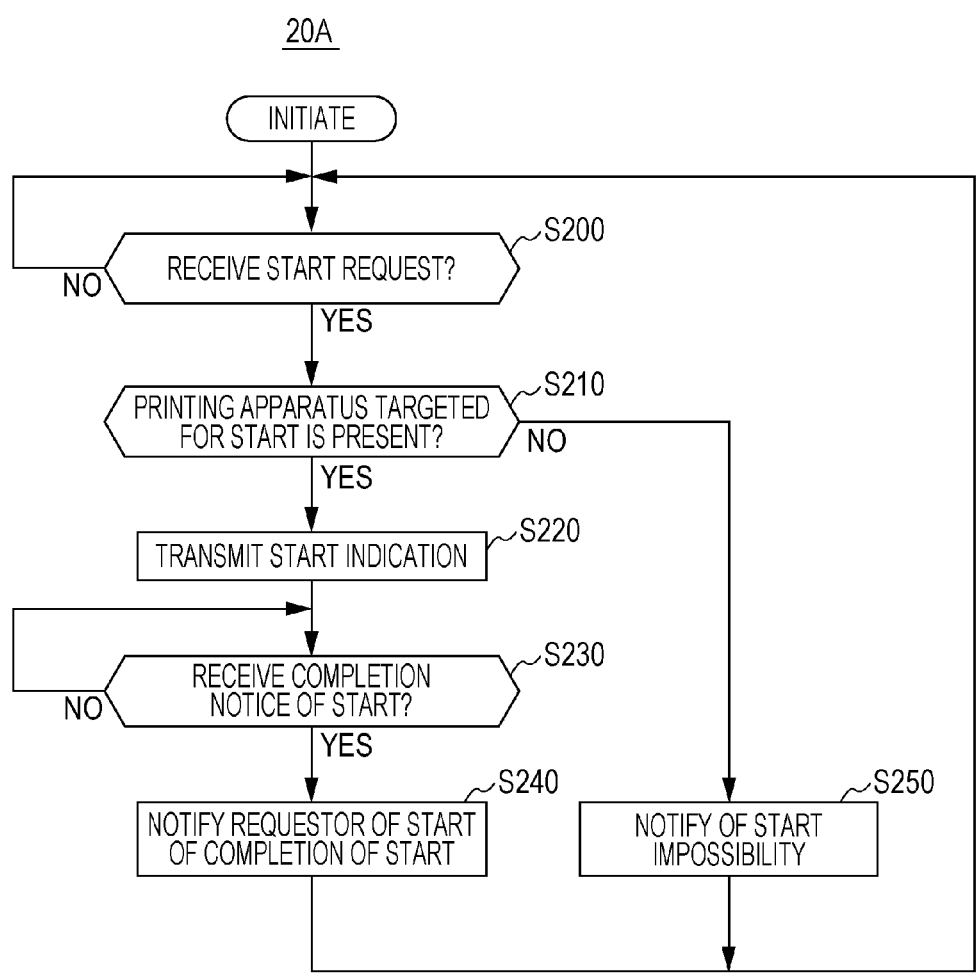
FIG. 7 is a flowchart showing an example of a start indication processing in a printing apparatus (start indicating apparatus).

FIG. 7 is a flowchart showing an example of a start indication processing in a printing apparatus (start indicating apparatus). The processing of this flow, for example, is initiated during a normal mode of the printing apparatus 20A.

The processing of this flow is initiated, the start request receiving unit 200 monitors whether or not the start request is received from the information processing apparatus 10 (S200). In a case of not receiving the start request (S200: NO), monitoring is continued.

In a case of receiving the start request (S200: YES), the start indicating unit 210 determines whether or not the printing apparatus 20 targeted for the start is present (S210). For example, the start indicating unit 210 determines whether or not indication information of the printing apparatus 20 included in the received start request is included in the printing apparatus list.

In a case where the printing apparatus 20 targeted for the start is present (S210: YES), the start indicating unit 210 transmits the start indication including identification information of the printing apparatus 20 targeted for the start (S220). Then, the status monitoring unit 220 monitors whether or not the completion notice of the start is received from the printing apparatus 20 targeted for the start indication (S230). In a case of not receiving the completion notice of the start (S230: NO), monitoring is continued.

In a case of receiving of the completion notice of the start (S230: YES), the status monitoring unit 220 transmits the completion notice of the start that indicates that the start of the printing apparatus 20 has been completed, with respect to the information processing apparatus 10 which is the transmission source for the start request (S240). Then, the processing is set back to S200.

On the other hand, in a case where the printing apparatus 20 targeted for the start is not present (S210: NO), the status monitoring unit 220 responds by sending information that indicates that it is difficult to start the printing apparatus 20 specified by the start request to the information processing apparatus 10 which is the transmission source for the start request (S250). Then, the processing is set back to S200.

Figure 8:
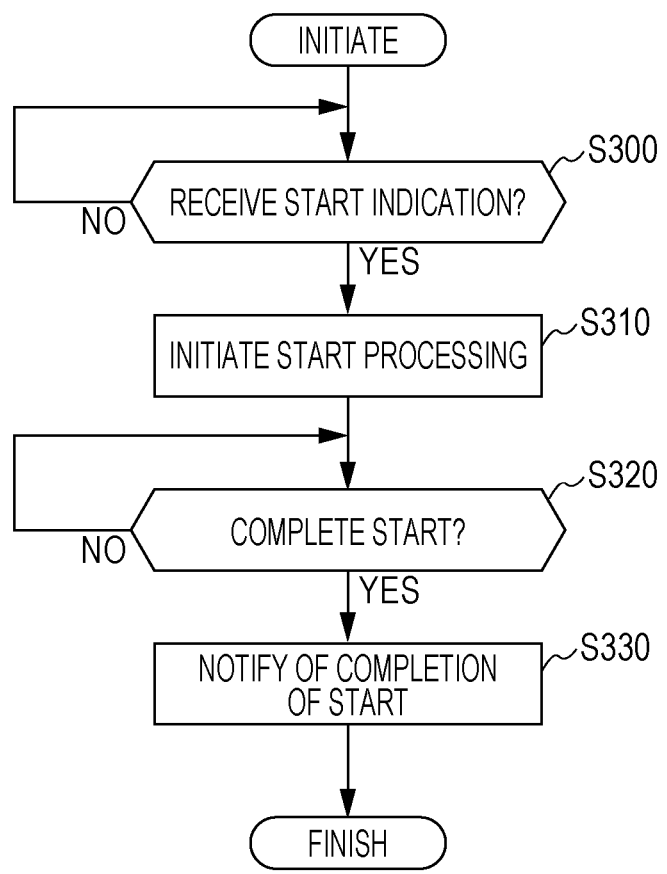
FIG. 8 is a flowchart showing an example of a start processing in a printing apparatus.

FIG. 8 is a flowchart showing an example of a start processing in a printing apparatus. For example, the processing of this flow is initiated in a case where the printing apparatus 20 is migrated from a normal mode to a power saving mode.

When the processing of this flow is initiated, the start indication receiving unit 250 monitors whether or not the start indication is received (S300). Specifically, the start indication receiving unit 250 monitors whether or not the start indication intended for its own apparatus is received. In a case of not receiving the start indication (S300: NO), monitoring is continued.

In a case of receiving the start indication (S300: YES), the start controlling unit 260 initiates the start processing. Then, the status transmitting unit 270 monitors whether or not the start processing is completed (S320). In a case of not completing the start processing (S320: NO), monitoring is continued.

In a case of completing the start processing (S320: YES), the status transmitting unit 270 transmits the completion notice of the start to the printing apparatus 20A which is the transmission source for the start indication (S330).

After executing the processing of S330, the printing apparatus 20 finishes the processing of this flow.

Figure 9:
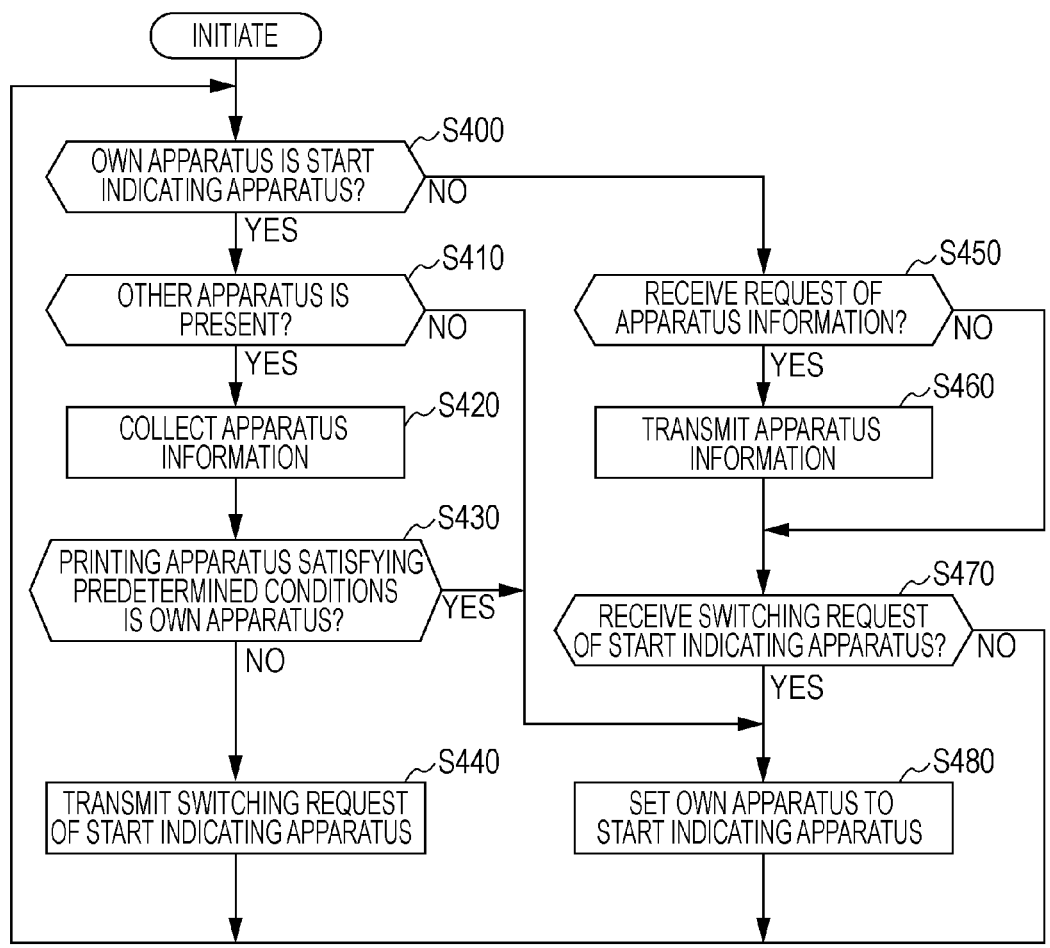
FIG. 9 is a flowchart showing an example of a switching processing in a printing apparatus (start indicating apparatus).

FIG. 9 is a flowchart showing an example of a switching processing in a printing apparatus (start indicating apparatus). The processing of this flow, for example, is initiated while the printing apparatus 20 and the printing apparatus 20A are in a normal mode.

When the processing of this flow is initiated, the start indicating apparatus switching unit 240 determines whether or not its own apparatus is the start indicating apparatus (S400). In a case where its own apparatus is the start indicating apparatus (S400: YES), the start indicating apparatus switching unit 240 determines whether or not other printing apparatus is present (S410).

In a case where other printing apparatus is present (S410: YES), the apparatus information collecting unit 230 requests apparatus information from other printing apparatus to collect (S420). Then, the start indicating apparatus switching unit 240 specifies a printing apparatus (including its own apparatus) satisfying the predetermined conditions based on the apparatus information of each printing apparatus (including its own apparatus) and determines whether or not the specified printing apparatus is its own apparatus (S430).

In a case where the printing apparatus satisfying the predetermined conditions is not its own apparatus (S430: NO), the start indicating apparatus switching unit 240 transmits a switching request of the start indicating apparatus with respect to the printing apparatus 20 specified by S430 (S440). Further, the function of its own apparatus as the start indicating apparatus is stopped. Then, the processing is set back to S400.

On the other hand, in a case where its own apparatus is not the start indicating apparatus (S400: NO), the apparatus information transmitting unit 290 monitors whether or not the request for the apparatus information is received from the printing apparatus 20A (S450). In a case of receiving the request for the apparatus information (S450: YES), the apparatus information transmitting unit 290 transmits the apparatus information of its own apparatus to the transmission source for the request (S460).

In a case of not receiving the request for the apparatus information (S450: NO), or in a case of transmitting the apparatus information (S460), the start indicating apparatus switching unit 240 monitors whether or not the switching request is received from the start indicating apparatus (S470). In a case of not receiving the switching request (S470: NO), the processing is set back to S400.

In a case of receiving the switching request (S470: YES), in a case where other printing apparatus is not present (S410: NO), or in a case where the printing apparatus satisfying the predetermined conditions is its own apparatus (S430: YES), the start indicating apparatus switching unit 240 initiates or continues the function of its own apparatus as the start indicating apparatus. Then, the processing is set back to S400.

Process units of each flowchart described above are divided according to the main processing details in order to facilitate understanding of the processing of an information processing apparatus 10, a printing apparatus 20 and a printing apparatus 20A. The invention is not limited by the way to divide the process units or their names. The processing of the information processing apparatus 10, the printing apparatus 20 and the printing apparatus 20A may also be divided into even more process units according to the processing details. Furthermore, the processing may also be divided so that one process unit includes even more processing. Further, processing orders of each flowchart described above are not limited to examples as shown by these views.

An example of a first embodiment of the invention has been described above. According to the embodiment, it is possible to determine the status of the start processing of the printing apparatus connected through a router in the information processing apparatus. Further, it is possible to reduce electric power consumption in the system, including the start indicating apparatus. In addition, it is possible to enhance convenience of a remote start on the printing apparatus.

That is, in the embodiment, the start indicating apparatus monitors the completion notice of the start from the printing apparatus targeted for the start indication. Then, in a case of receiving the completion notice of the start, the start indicating apparatus transmits the completion notice of the start to the information processing apparatus which is connected through the router and is the requestor of the start. According to such a configuration, it is possible for the information processing apparatus to determine that the start processing of the printing apparatus has been completed.

In addition, in the embodiment, in a case the printing apparatus receives the start indication, by transmitting information that indicates the initiation of the start processing or the estimated starting time for the start processing to the start indicating apparatus, it is also possible for the start indicating apparatus to transmit this information to the information processing apparatus. According to such a configuration, it is possible for the information processing apparatus to determine the initiation of the start processing or the state of progress of the start processing as well as to notify the user.

In addition, in the embodiment, it is also possible for the printing apparatus to operate as a start indicating apparatus. According to such a configuration, there is no need to be provided with the dedicated start indicating apparatus separately and it is possible to reduce electric power consumption, cost, and the like in the entire system.

In addition, in the embodiment, the printing apparatus that operates as the start indicating apparatus is dynamically switched to the printing apparatus satisfying the predetermined conditions. According to such a configuration, it is possible to operate the printing apparatus, which satisfies users' desired conditions, as the start indicating apparatus.

The printing apparatus that operates as the start indicating apparatus is capable of being dynamically switched to the apparatus which has the lowest electric power consumption among the printing apparatuses. According to such a configuration, since the electric power consumption on the start indicating apparatus, which continues to operate in a normal mode, becomes small, it is possible to reduce the electric power consumption in the printing system.

In addition, in the embodiment, the printing apparatus that operates as the start indicating apparatus may be switched to the printing apparatus which has the fastest printing speed among the printing apparatuses. By a user of the information processing apparatus using the start indicating apparatus for the printing without performing the start request, it is possible to perform printing even faster. Then, if the starts of the printing apparatus other than the start indicating apparatus are reduced, it is possible to reduce the electric power consumption in the printing system.

In addition, in the embodiment, the printing apparatus that operates as the start indicating apparatus may be switched to the printing apparatus which has the highest frequency of the printing among the printing apparatuses. In so doing, since the start indicating apparatus for the printing is used much more frequently, the start requests for other printing apparatus are reduced and it is possible to reduce the electric power consumption in the printing system.

Here, the embodiments of the invention described above intend to exemplify the gist and the scope of the invention and are not limited thereto. Various alterations, corrections, and modification examples are self-evident for those skilled in the art.

For example, the information processing apparatus may transmit information specifying the functions targeted for the start, along with the start request or after the start request. Specifically, for example, a first start mode that starts all devices of the printing apparatus 20, a second start mode that does not start a part of the devices (for example, operation panel 28), or the like is able to be specified. Then, the printing apparatus 20A transmits the start indication including the designation for the functions targeted for the start to the printing apparatus 20. The printing apparatus 20 receives the start indication specifying the functions targeted for the start and performs the start processing of the devices corresponding to the specified functions. In so doing, it is possible to complete the start even quicker.

In addition, for example, the printing apparatus 20 may calculate the estimated starting time regularly or at a predetermined timing and transmit it to the printing apparatus 20A while monitoring the progress of the start processing until the start is completed. The printing apparatus 20A transmits the estimated starting time received regularly or at the predetermined timing to the information processing apparatus 10. Then, the information processing apparatus 10 corrects the estimated staring time which is displayed using the estimated starting time received form the printing apparatus 20A. In so doing, it is possible to notify a user of more accurate state of progress.

In addition, for example, the printing apparatus 20 may transmit the completion notice of the start if the status is ready to be able to receive the print job, even before the start is completed. In so doing, it is possible to initiate the printing even quicker.

In addition, for example, during the start processing of a certain printing apparatus 20, in a case of receiving the start request of the printing apparatus 20 from other information processing apparatus 10, the printing apparatus 20A may response to the fact that the printing apparatus 20 is in course of the start processing. In so doing, it is possible for the other information processing apparatus to determine that the start processing has already initiated as well as to notify a user of the fact.

Here, this invention can be applied to a printing apparatus as well as a network apparatus having a power saving mode such as, for example, a copier, a multifunction printer, a scanner or a projector.

What is claimed is:
1. A network system comprising:
a plurality of network apparatuses;
at least one of the plurality of said network apparatuses that supports a non-operational state wherein said one of the plurality of said network apparatus is substantially non-operational, and supports an operational state wherein said one of the plurality of said network apparatus is substantially operational;
a terminal apparatus that issues a start request, the start request including identification information specifying a target network apparatus selected from among said at least one of the plurality of said network apparatuses; and a start management apparatus that receives the start request and transmits a start-up command to the targeted network apparatus specified by the identification information of the start request;

wherein while in its non-operational state, the targeted network apparatus receives and responds to the transmitted start-up command by initiating a start process that transits said targeted network apparatus from its non-operational state to its operational state;

wherein the start-up management apparatus and the targeted network apparatus are connected to the terminal apparatus through a repeating apparatus, wherein the targeted network apparatus includes a status transmitting section that transmits an execution notice indicating the execution of the start process to the start management apparatus while the targeted network apparatus is in its non-operational state, and transmits a completion notice to the start management apparatus when the targeted network apparatus finishes its transition to its operational state, wherein the start management apparatus includes a status monitoring section that receives transmissions of said execution notice and said completion notice, and retransmits the received transmissions of said execution notice and completion notice to the terminal apparatus through the repeating apparatus, wherein the terminal apparatus includes a status receiving section that receives the execution notice and the completion notice from the start management apparatus, and a network-apparatus control section that transmits a network-apparatus control command to the targeted network apparatus in response to receiving the completion notice, and wherein:
the terminal apparatus further includes a status displaying section that displays an execution progress in response to receiving the execution notice until the completion notice is received;
said execution notice includes an estimated time required for the targeted network apparatus to complete execution of said start process and be in its operational state; and
the status displaying section displays a progress of the targeted apparatus's execution of its start process based on the estimated tine to inform the user,
wherein all of said plurality of network apparatuses further support the functions of said start management apparatus, and a freely selected one among said plurality of network apparatuses is designated said start management apparatus, and
wherein the network apparatus that is currently designated as said start management apparatus is herein termed a current management apparatus;
all of said plurality of network apparatus include an apparatus information transmitting section that transmit apparatus information about themselves to the currently designated start management apparatus; and
the current start management apparatus further includes;
an apparatus information collecting section that collects the apparatus information of each of the plurality of network apparatuses; and
a switching section that selects a particular one of the plurality of network apparatus satisfying predetermined conditions based on the collected apparatus information and switches operational roles with the selected network apparatus so that current start management apparatus becomes one of said plurality of network apparatus and the selected network apparatus is newly designated as the current start management apparatus.

2. The network system according to claim 1,
wherein the execution notice includes information that indicates the initiation of execution of the start process, and
wherein the status displaying section displays information that indicates that execution of the start process has been initiated by the targeted network apparatus.

3. The network system according to claim 1, wherein the transmitted apparatus information includes internal electric power consumption information, internal performance information or internal usage history information; and wherein the switching section selects the network apparatus that has the minimum electric power consumption, the highest performance, or the highest frequency of use among said plurality of network apparatuses based on the collected apparatus information.

4. The network system according to claim 1,
wherein the terminal apparatus transmits the start request to the start management apparatus using unicast, and
wherein the start management apparatus transmits the start-up command to the targeted network apparatus using broadcast.

5. A network system comprising:
(a) a plurality of devices on a single first computing network, wherein:
(i) each device in said plurality of devices supports a normal mode of operation wherein power is not turned off to that device;
(ii) at least a fraction of said plurality of devices additionally support a power-down mode of operation wherein power is turned off to that device except for a part of that device necessary for monitoring said first network for a predetermined packet indicating reception of a start-up command for that device;
(iii) a first one of said plurality of devices is designated a start-controlling device, and the remainder of said fraction of said plurality of devices are designated power-up-controlled devices;
(iv) the start-controlling device being continuously in its normal mode of operation while its start-controlling device designation is valid;
(v) each power-up-controlled device transitioning from its power-down mode of operation to its normal mode of operation in response to receiving its start-up command;
(b) a terminal apparatus that issues a start-up request to the start-controlling device, the start-up request including identification information specifying a specific one of said power-up-controlled devices as a targeted network apparatus, wherein said start-controlling device responds to receiving said start-up request by issuing to the targeted network apparatus its start-up command over said first network;
wherein the targeted network apparatus further responds to receiving its start-up command by transmitting a status notice while it has not yet transitioned from its power-down mode of operation to its normal mode of operation, and
wherein:
the terminal apparatus further includes a status displaying section that displays an execution progress in response to receiving the execution notice until the completion notice is received:

said execution notice includes an estimated time required for the targeted network apparatus to complete execution of said start process and be in its normal mode: and the status displaying section displays a progress of the targeted apparatus's execution of its start process based on the estimated time to inform the user, wherein all of said plurality of devices further support the functions of said start-controlling devices, and a freely selected one among said plurality of device is designated said start-controlling device;

wherein the network apparatus that is currently designated as said start-controlling device is herein termed a current controlling device;

all of said plurality of device include a device information transmitting section that transmit device information about themselves to the currently designated start-controlling device;

and the current start-controlling device further includes:

a device information collecting section that collects the device information of each of the plurality of device; and a switching section that selects a particular one of the plurality of device satisfying predetermined conditions based on the collected device information and switches operational roles with the selected device so that current start-controlling device becomes one of said plurality of device and the selected device is newly designated as the current start-controlling device.

6. The network system of claim 5, wherein:

said status notice includes a pre-stored and fixed wait-time period, said wait-time period being an estimate of a time needed for the targeted network apparatus to finish its transition to its normal mode of operation and to become ready to respond to operational requests from said terminal apparatus;

said terminal apparatus responds to reception of said wait-time period by starting a timer that establishes a wait period during which the terminal apparatus waits until the elapse of said wait-time period before attempting communication with said targeted network apparatus;

said targeted network apparatus further responds to receiving its start-up command by transmitting a second status notice in response to finishing its transition to its normal mode of operation and becoming ready to respond to operational requests; and said terminal apparatus responds to reception of said second status notice by ending said wait period and initiating communications with said targeted network apparatus irrespective of the status of said timer.

7. The network system of claim 5, wherein:

said status notice includes a wait-time period calculated to be a current estimate of a time needed for the targeted network apparatus to finish its transition to its normal mode of operation and to become ready to respond to operational requests from said terminal apparatus, calculation of said current time estimate including measured physical conditions of internal components of said targeted network apparatus.

8. The network system of claim 7, wherein:

said terminal apparatus responds to reception of said wait-time period by starting a timer that establishes a wait period during which the terminal apparatus waits until the elapse of said wait-time period before attempting communication with said targeted network apparatus;

said targeted network apparatus further responds to receiving its start-up command by transmitting a second status notice in response to finishing its transition to its normal mode of operation and becoming ready to respond to operational requests; and said terminal apparatus responds to reception of said second status notice by ending said wait period and initiating communications with said targeted network apparatus irrespective of the status of said timer.

9. The network system of claim 5, wherein:

said start-controlling device and said power-up controlled devises are printers;

said status notice is one of a series of status notices indicating a progress of said targeted network apparatus as it transitions from its power-down mode of operation to its normal mode of operation; and said normal mode of operation is characterized by the targeted network apparatus being ready to receive and execute received print requests.

10. The network system of claim 5, wherein:

said terminal apparatus is on a second computing network communicatively coupled to said first computing network through a repeating apparatus;

said terminal apparatus sends said start-up request to said start-controlling device through said repeating apparatus, and said start-controlling device responds to reception of said start-up request by sending the start-up command to the targeted network apparatus specified in the identification information of the start-up request;

said start-controlling device receives said status notice from said targeted network apparatus and forwards said status notice to said terminal apparatus through said repeating apparatus.

11. The network system of claim 10, wherein:

said start-controlling device further supports said power-down mode of operation, and supports optionally operating under either the start-controlling device designation or the power-up-controlled device designation;

said first plurality of devices further support optionally operating under either the start-controlling device designation or the power-up-controlled device designation; and said plurality of devices on said single first computing network provide apparatus-information about themselves, and any one of said devices within said plurality of devices whose apparatus-information meets pre-specified operation criteria is designated said start-controlling device, and the remaining devices within said plurality of devices are designated power-up controlled devices under control of the designated start-controlling device.

12. The network system of claim 11, wherein the apparatus-information of each device includes a power consumption measure of that device, and the device within said plurality of devices that has the lowest power consumption measure among said plurality of devices is designated the start-controlling device.

13. The network system of claim 11, wherein the apparatus-information of each device includes a measure of how frequently it is used, and the device within said plurality of devices that has the highest frequency-of-use measure is designated said start-controlling device.

14. The network system of claim 11, wherein:

the currently designated start-controlling device interrogates the power-up-controlled devices to receive their apparatus-information, and based on the gathered apparatus-information elects one of said power-up controlled devices for a designation changed, the currently designated start-controlling device changes its own designation from start-controlling device to that of a power-up-controlled device and assumes the operation of a power-up-controlled device; and the elected power-up controlled device responds to its election by changing its designation from power-up-controlled device to that of start-controlling device, and assumes the operation of the start-controlling device.

15. The network system of claim 11, wherein:

prior to issuing said start-up request, said terminal apparatus sends to said first network an identity-inquiry request that requests the identity of the start-controlling device within said first network;

the current start-controlling device responds to said identity-inquiry request by identifying itself to the terminal apparatus as the start-controlling device; and said terminal apparatus issues said start-up request to the identified start-controlling device.

16. The network system according to claim 1, wherein:

said network apparatus control section is a printer control section;

said network-apparatus control command is a printing command;

said targeted network apparatus is a printer that is responsive to said printing command when it is in its operational state and is non-responsive to said printing command when it is in its non-operational state; and while not in its operational state, said targeted network apparatus is disabled from storing any printing commands transmitted to it.

17. A terminal apparatus comprising:

a start request section that issues a start request, the start request including identification information specifying a target network apparatus selected from among at least one network apparatus;

wherein the at least one network apparatus supports a non-operational state wherein said network apparatus is substantially non-operational, and supports an operational state wherein said network apparatus is substantially operational;

wherein a start management apparatus receives the start request and transmits a start-up command to the targeted network apparatus specified by the identification information of the start request;

wherein while in its non-operational state, the targeted network apparatus receives and responds to the transmitted start-up command by initiating a start process that transits said targeted network apparatus from its non-operational state to its operational state;

wherein the start-up management apparatus and the targeted network apparatus are connected to the terminal apparatus through a repeating apparatus, wherein the targeted network apparatus includes a status transmitting section that transmits an execution notice indicating the execution of the start process to the start management apparatus while the targeted network apparatus is in its non-operational state, and transmits a completion notice to the start management apparatus when the targeted network apparatus finishes its transition to its operational state, wherein the start management apparatus includes a status monitoring section that receives transmissions of said execution notice and said completion notice, and retransmits the received transmissions of said execution notice and completion notice to the terminal apparatus through the repeating apparatus, wherein the terminal apparatus includes a status receiving section that receives the execution notice and the completion notice from the start management apparatus, and a network-apparatus control section that transmits a network-apparatus control command to the targeted network apparatus in response to receiving the completion notice, and wherein:

the terminal apparatus further includes a status displaying section that displays an execution progress in response to receiving the execution notice until the completion notice is received;

said execution notice includes an estimated time required for the targeted network apparatus to complete execution of said start process and be in its operational state; and the status displaying section displays a progress of the targeted apparatus's execution of its start process based on the estimated time to inform the user, wherein said terminal apparatus is included within a network system comprising:

a plurality of network apparatuses, wherein all of said plurality of network apparatus further support the functions of said start management apparatus, and a freely selected one among said plurality of network apparatuses is designated said start management apparatus;

wherein the network apparatus that is currently designated as said start management apparatus is herein termed a current management apparatus;

all of said plurality of network apparatuses include an apparatus information transmitting section that transmit apparatus information about themselves to the currently designated start management apparatus; and the current start management apparatus further includes:

an apparatus information collecting section that collects the apparatus information of each of the plurality of network apparatuses; and a switching section that selects a particular one of the plurality of network apparatuses satisfying predetermined conditions based on the collected apparatus information and switches operational roles with the selected network apparatus so that current start management apparatus becomes one of said plurality of network apparatus and the selected network apparatus is newly designated as the current start management apparatus.

18. A start management apparatus comprising:

a start request receiving section that receives a start request and transmits a start-up command to a targeted network apparatus specified by an identification information of the start request;

wherein the targeted network apparatus is one among at least one network apparatus that supports a non-operational state wherein said network apparatus is substantially non-operational, and supports an operational state wherein said network apparatus is substantially operational;

wherein the start request is issued by a terminal apparatus, the start request including the identification information specifying the target network apparatus selected from among said at least one network apparatus;

wherein while in its non-operational state, the targeted network apparatus receives and responds to the transmitted start-up command by initiating a start process that transits said targeted network apparatus from its non-operational state to its operational state;

wherein the start-up management apparatus and the targeted network apparatus are connected to the terminal apparatus through a repeating apparatus, wherein the targeted network apparatus includes a status transmitting section that transmits an execution notice indicating the execution of the start process to the start management apparatus while the targeted network apparatus is in its non-operational state, and transmits a completion notice to the start management apparatus when the targeted network apparatus finishes its transition to its operational state, wherein the start management apparatus includes a status monitoring section that receives transmissions of said execution notice and said completion notice, and retransmits the received transmissions of said execution notice and completion notice to the terminal apparatus through the repeating apparatus, wherein the terminal apparatus includes a status receiving section that receives the execution notice and the completion notice from the start management apparatus, and a network-apparatus control section that transmits a network-apparatus control command to the targeted network apparatus in response to receiving the completion notice, wherein:

the terminal apparatus further includes a status displaying section that displays an execution progress in response to receiving the execution notice until the completion notice is received;

said execution notice includes an estimated time required for the targeted network apparatus to complete execution of said start process and be in its operational state; and the status displaying section displays a progress of the targeted apparatus's execution of its start process based on the estimated time to inform the user, wherein said start management apparatus is included within a network system comprising:

a plurality of network apparatuses, wherein all of said plurality of network apparatuses further support the functions of said start management apparatus, and a freely selected one among said plurality of network apparatuses is designated said start management apparatus;

wherein the network apparatus that is currently designated as said start management apparatus is herein termed a current management apparatus;

all of said plurality of network apparatuses include an apparatus information transmitting section that transmit apparatus information about themselves to the currently designated start management apparatus; and the current start management apparatus further includes:

and apparatus information collecting section that collects the apparatus information of each of the plurality of network apparatuses; and a switching section that selects a particular one of the plurality of the network apparatuses satisfying predetermined conditions based on the collected apparatus information and switches operational roles with the selected network apparatus so that current start management apparatus becomes one of said plurality of network apparatus and the selected network apparatus is newly designated as the current start management apparatus.

* * * * *